United States Patent
Kijima et al.

(10) Patent No.: US 7,064,787 B2
(45) Date of Patent: Jun. 20, 2006

(54) METHOD AND APPARATUS FOR ADJUSTING SWEEP-OUT FREQUENCY FOR AN IMAGING APPARATUS RESPONSIVE TO AN OPERATING STATE OF A STROBO MEANS

(75) Inventors: Takayuki Kijima, Akiruno (JP); Masataka Ide, Hachioji (JP)

(73) Assignee: Olympus Corporation, Tokyo (JP)

( * ) Notice: Subject to any disclaimer, the term of this patent is extended or adjusted under 35 U.S.C. 154(b) by 809 days.

(21) Appl. No.: 10/068,319

(22) Filed: Feb. 5, 2002

(65) Prior Publication Data

US 2002/0093580 A1    Jul. 18, 2002

Related U.S. Application Data

(62) Division of application No. 09/350,335, filed on Jul. 9, 1999.

(30) Foreign Application Priority Data

Jul. 10, 1998 (JP) .............................. 1998-195942

(51) Int. Cl.
  *H04N 3/14* (2006.01)
  *H04N 5/335* (2006.01)

(52) U.S. Cl. ...................... 348/296; 348/372; 348/357; 348/312; 348/364

(58) Field of Classification Search ................ 348/370, 348/371, 296, 297, 298, 299, 372, 345, 346, 348/348, 350, 353, 354, 355, 356, 221.1, 348/224.1, 235, 234, 294, 295, 312, 314
See application file for complete search history.

(56) References Cited

U.S. PATENT DOCUMENTS

| | | | |
|---|---|---|---|
| 5,027,215 A | | 6/1991 | Takayama et al. |
| 5,031,048 A | | 7/1991 | Naruto et al. |
| 5,168,364 A | * | 12/1992 | Kondo et al. ............ 348/230.1 |
| 5,206,730 A | * | 4/1993 | Sakai ....................... 348/220.1 |
| 5,257,060 A | * | 10/1993 | Kotani et al. ................ 396/109 |
| 5,331,154 A | * | 7/1994 | Kondo et al. .......... 250/231.17 |
| 5,436,656 A | | 7/1995 | Soga et al. |
| 5,669,023 A | * | 9/1997 | Iida ............................ 396/129 |
| 5,745,646 A | | 4/1998 | Saito |
| 5,825,511 A | * | 10/1998 | Hori et al. ................... 358/486 |
| 5,963,255 A | * | 10/1999 | Anderson et al. ........... 348/372 |
| 5,982,984 A | | 11/1999 | Inuiya |
| 6,233,016 B1 | * | 5/2001 | Anderson et al. ........... 348/372 |
| 6,292,220 B1 | * | 9/2001 | Ogawa et al. .............. 348/312 |
| 6,700,610 B1 | * | 3/2004 | Kijima et al. ............... 348/296 |

FOREIGN PATENT DOCUMENTS

JP           10191170           7/1998

* cited by examiner

*Primary Examiner*—Ngoc-Yen Vu
*Assistant Examiner*—Nelson D. Hernandez
(74) *Attorney, Agent, or Firm*—Volpe and Koenig, P.C.

(57) ABSTRACT

An operating condition judging means judges at least one of consumed current, whether or not a mechanically driven part is being operated, the supply voltage level, the ambient temperature, whether or not the lens stop device is operative, whether or not the strobo device is being charged, and whether or not access operation of a recording device is being performed. A controller controls a frequency of sweep-out of unnecessary charge in the imaging element on the basis of the output of an operating condition judging device. Thus, it is possible to effectively reduce the peak consumed current through the entire imaging apparatus, reduce the power consumption and extend the battery life.

7 Claims, 17 Drawing Sheets

(a)

(b)

METHOD AND APPARATUS FOR ADJUSTING SWEEP-OUT FREQUENCY FOR AN IMAGING APPARATUS RESPONSIVE TO AN OPERATING STATE OF A STROBO MEANS

CROSS REFERENCE TO RELATED APPLICATION

This application is a divisional of U.S. application Ser. No. 09/350,335, filed Jul. 9, 1999.

FIELD OF THE INVENTION

The present invention relates to imaging apparatus having an imaging element, which are used for electronic still cameras, digital cameras and the like.

BACKGROUND

Hitherto, various imaging elements applicable to such imaging apparatuses have been proposed. Among such imaging elements is an inter-line CCD solid-state imaging element having a vertical overflow drain structure as schematically shown in FIG. 15.

The CCD shown in FIG. 15 comprises a two-dimensional array of photo-diodes 1 arranged in both horizontal and vertical directions and each constituting a photo-electric converting cell or accumulating charge according to light incidence, a plurality of vertical shift registers 3 constituting vertical shift paths for receiving charge accumulated in associated photo-diodes 1 via a transfer gate 2 and progressively vertically shifting the received charge, a horizontal shift register 4 constituting a horizontal shift path for receiving shifted charge from the vertical shift registers 3 and progressively horizontally shifting the received charge, and a signal detector 5 for amplifying the output signal of the horizontal shift register 4 and outputting the amplified signal.

FIG. 16 is a block diagram showing the basic construction of an imaging apparatus with the CCD shown in FIG. 15. The illustrated imaging apparatus comprises a focusing lens 11, a shutter means 12, a CCD 13, a signal processor 14, a shutter driver 16, a signal generator 17, a CPU 18, a lens stop means 20, a recording means 21 and a lens stop driver 22. The focusing lens 11 focuses a light beam of a scene on a light incidence surface of the CCD 13. The lens stop means 20 stops or reduces the area of the light flux of the scene from the lens 11. The shutter means 12 is constituted by, for instance, a mechanical shutter for either passing or blocking the scene light flux. The CCD 1 converts the scene light beam flux having passed through the shutter means 12 to an electric signal. The signal processor 14 performs various processes on the electric signal from the CCD 13 and outputs an image signal thus generated. The recording means 21 has a DRAM for storing the image signal from the signal processor 14 as a still image or a recording medium on which the compresses image signal is recorded as a still image. The shutter driver 16 controls the shutter means 12. The lens stop driver 22 controls the lens stop means 20. The signal generator 17 supplies pulses for controlling the period of charge accumulation in the photo-diodes 1, pulses for driving the vertical shift registers 3 and pulses for driving the horizontal shift registers 3 and pulses for driving the horizontal shift register 4 to the CCD 13 and also supplies pulses for driving the signal processor 14 in synchronism to the CCD 13. The CPU 18 collectively controls circuits including the signal generator 17 and the lens stop driver 22. The signal processor 14 and the signal generator 17 together constitute a digital signal processor (DSP) 19.

FIG. 17 is a timing chart illustrating a conventional imaging operation in the imaging apparatus shown in FIG. 16. Specifically, the Figure shows a vertical sync signal VD, a transfer gate pulse train TG, a sub-pulse train SUB, a vertical shift register shift pulse train VT, a clamp pulse train CLP, opening/closing operation of the shutter means 12, operations of the lens stop means 20 and the lens stop driver means 22 and a CCD signal, i.e., a signal read out from the CCD 13.

The vertical sync signal VD is a pulse train prescribing a predetermined unit period of time for obtaining a signal representing one image (i.e., one frame image). Here, periods prescribed by the individual pulses are labeled V1, V2, . . . .

The transfer gate pulse train TG consists of pulses for determining the timing of the transfer of charge stored in the photo-diodes 1 to the vertical shift registers 3, and is applied to the transfer gate 2 in synchronism to the vertical sync signal VC. The transfer gate pulses TG corresponding to the periods V1, V2, . . . of the vertical sync signal VD are labeled TG0, TG1, . . . .

The sub-pulse train SUB consists of pulses for discharging charge generated in the photo-diodes 1 in the vertical direction of the substrate. The discharge of charge is done while sub-pulses SUB are outputted. That is, the charge is accumulated in the photo-diodes 1 during periods tb1, tb2, . . . , in which the sub-pulses SUB are stopped in the periods V1, V2, . . . of the vertical sync signal VD. Thus, it will be seen that a so-called electron (or element) shutter is realized, in which the effective exposure time is controlled through control of the charge accumulation period. The charge accumulation time is determined as a result of measurement of light of the scene image with a measuring means (not shown), and it is measured by counting sub-pulses SUB.

The vertical shift register shift pulse train VT consists of pulses for causing progressive shift of charge in the vertical shift registers 3 toward the horizontal shift register 4.

The clamp pulse train CLP consists of pulses for clamping portions of the CCD signal corresponding to optical black portion of the CCD. By the clamping, the potential level of the image signal is stabilized to hold a stable black level.

The shutter means 12 is normally open, and is closed (light-shuttered or -blocked) when causing the transfer of charge accumulated in the photo-diodes 1 in response to a recording trigger signal. As the recording trigger signal, in the case of a shutter release button (not shown) providing a two-stage trigger signal, that is, in the case when a first trigger pulse is generated in a preparatory stage of lightly depressing the shutter release button for recording and a second trigger pulse is generated by further depressing the shutter release button for starting the recording of a still image, the second trigger pulse corresponds to the recording trigger signal.

The CCD signal has time sections to1 and to2 corresponding to optical black portions in the vertical direction and an effective time section intervening as a scene image period between these time sections. Normally the optical black signal is at a higher level than the effective period signal level.

The lens stop means 20 is normally in an open diameter state, in the case of such a bright scene that normal exposure will be exceeded with the sole electronic shutter operation in its open diameter state, it is driven to stop the light flux.

As is seen from the timing chart of FIG. 17, in the prior art imaging apparatus upon generation of a recording trigger signal in, for instance, the period V3, vertical shift register shift pulses VT are continuously outputted during a subsequent time section ta for fast sweep-out of unnecessary charge in the vertical shift registers 3, while steadily applying shift pulses without any pause period for the read-out. In the subsequent period V4, the charge is accumulated in the photo-diodes 1 by suspending the application of sub-pulses SUB for a time section tb4 corresponding to the exposure period, which has been determined by a light measurement process executed on the basis of the CCD signal until the recording trigger signal generation. At this time, appropriate exposure may not be ensured with the sole electronic shutter operation. In such a case, in synchronism with the start of the period V4 the lens stop driver 22 is turned on to cause the lens stop means 20 to stop or decrease the diameter of the scene light flux. At any rate, the time section tb4 constitutes an exposure time for one frame image.

In the subsequent period V5, the image obtained by the exposure during the time section tb4 in the period V4 is outputted as signal CCD4, which is outputted as a result of the exposure in response to the recording trigger signal from the signal amplifier 5. Also, in synchronism with the start of the period V5 the lens stop means 20 is driven back to the open state, while the shutter driver 16 is caused to drive the shutter means 12 for closing. In the subsequent period V6, the shutter means 12 is opened. The image obtained by exposure as a result of the closing operation of the shutter means 12 in the period V5 is outputted as signal CCD5 in the subsequent period V6. Since the signal CCD5 is obtained while the shutter means is blocking incident light, the signal levels in the optical black portion time sections and the effective period are substantially equal.

As shown above, in the prior art imaging apparatus, fast sweep-out of charge from the vertical shift registers 3 is executed in the period V3, during which the recording trigger signal is generated, the lens stop means 20 is selectively operated while causing charge accumulation in the photo-diodes 1 during the time section tb4 in the subsequent period V4, the lens stop means 20 is opened while driving the shutter means 12 for closing to cause transfer of the accumulated charge in the subsequent period V5, and the shutter means 12 is opened again in the subsequent period V6.

In the above prior art imaging apparatus, however, a response time tm is required from the start of the closing operation of the shutter means 12 until the perfectly closed state is brought about. In other words, even with the closing operation started at the start of the charge transfer period V5, during the response time tm the light is incident on the CCD 13, resulting in charge generation in the photo-diodes 1. Therefore, particularly in case of a bright scene the charge generated during the response time tm partly enters the vertical shift registers 3 in spite of the charge sweep-out in the vertical direction with sub-pulses SUB. Also, the generated charge remains on the substrate part of the photo-diodes 1, and is shifted by the vertical shift registers 3 after the shutter means 12 has been perfectly closed. Thus, a problem of the superimposition of smear on the intrinsic CCD signal is posed. Here, the lens stop means 20 has a response characteristic similar to that of the shutter means 12.

To solve the problem noted above, the applicant has earlier proposed an imaging apparatus, which has the structure as shown in FIG. 16, and in which the imaging operation is controlled with timings as shown in FIG. 18 (Japanese Patent Application No. 8-344052). In this imaging apparatus, after the recording trigger pulse generation the fast sweep-out of unnecessary charge in the vertical shift registers 3 is executed in a time section tc in synchronism to transfer gate pulse TG3 synchronized to the vertical sync signal VD. The vertical shift register shift pulse VT for the fast sweep-out period tc need not be synchronized to the horizontal blanking period because of the fact that unnecessary charge which is not used as data is swept out.

Transfer gate pulse TG4 prescribes the end instant of the fast sweep-out period tc, and also causes transfer of signal charge having been accumulated during the charge accumulation time section tb4 to the vertical shift registers 3. The timing of generation of the pulse TG4 is set such that it is earlier than the start of the next period V5 by a predetermined time interval tv, which is determined on the basis of the response time tm of the shutter means 12 and an allowance thereof. The shutter driver 16 is thus caused to drive the shutter means 12 for closing in synchronism to the transfer gate pulse TG4.

Furthermore, the vertical shift of the signal charge transferred to the vertical shift registers 3, is suspended for predetermined time tv, and the read-out is started by starting the application of vertical shift register shift pulses VT in synchronism with the end of this vertical shift suspension time tv, i.e., with the start of the next period V5. The timing of the start of the charge accumulation time section tb4 after the generation of the recording trigger signal, is determined to be earlier than the timing of generation of the transfer gate pulse TG4 by the charge accumulation time section tb4. In the case of determining the charge accumulation time section tb4 while causing stopping of the scene light flux, the lens stop driver 22 is turned off such that the lens stopping operation of the lens stop means 20 is caused at the start of the period V4 and turned off in synchronism to the end of the charge accumulation time section tb4, i.e., the transfer gate pulse TG4.

With the imaging apparatus as described, the shutter means 12 can be in the perfectly closed or light-blocked state in the period V5, in which the signal charge accumulated during the charge accumulation time section tb4 in the period V4 is read out. It is thus possible to solve the above problem of smear and obtain high quality image signal.

However, as a result of various experimental researches and investigations conducted by the inventors, it was found that the above imaging apparatus proposed by the applicant has the following problems to be solved. A portable imaging apparatus such as an electronic still camera or a digital camera uses a battery, and consumed (consumption) power reduction is particularly demanded for such imaging apparatus. In the imaging apparatus as described above, the period of driving the lens stop means 20 is the same as the fast sweep-out time section tc for sweeping out unnecessary charge in the CCD 13. For the fast sweep-out, transfer pulses are applied at an iteral frequency (i.e., sweep-out frequency) f, which is usually proportional to peak consumed current I in the CCD 13 at this time as shown in FIG. 19. That is, with increasing sweep-out frequency, the peak consumed current I is increased to increase the consumed power.

Therefore, where the sweep-out frequency f is fixed at a high frequency f1, a very high peak consumed current, which includes the fast sweep-out current for the fast sweep-out and a stop holding current for holding the stopping state of the lens stop means 20, flows through the entire imaging apparatus during the fast sweep-out time section tc as shown in FIG. 18. Particularly, where the lens stop means 20 is normally-open type, a higher peak consumed current flows at the moment of the start of the sweep-out. Such very high peak consumed current increases the power consumption to reduce the battery life and, depending on the battery capacity, reduces the supply voltage, possibly resulting in stoppage of the system operation.

Such a problem is also encountered in the case where an access operation for writing the image data from the CCD 13 is written in the recording means 21 in the fast sweep-out time section tc, and is more readily encountered in the case where the stopping operation of the lens stop means 20 is caused concurrently with such access operation for writing the image data in the recording means 21. Furthermore, a like problem is encountered where the operation of the lens stop means 20 and the fast sweep-out of unnecessary charge are performed at different timings as shown in FIG. 17, the residual battery capacity is less, or the battery capacity is reduced due to a low ambient temperature. Moreover, where signal charge in some lines of the CCD 13 is read out while the charge in the other lines is swept out by fast sweep-out to improve the frame rate during a period from the first trigger pulse till the recording trigger, a like problem is encountered in the case of charging a strobo means or the like concurrently during this time.

SUMMARY OF THE INVENTION

The present invention was made in view of the above background, and it has an object of providing an imaging apparatus capable of effective reduction of the peak consumed current through the entire imaging apparatus, reduction of the power consumption and extension of the battery life.

According to a first aspect of the present invention, there is provided an imaging apparatus having an imaging element for accumulating signal charge corresponding to an incident scene light flux in a photo-electric converting element section comprising: a sweep-out means for sweeping out unnecessary charge in the imaging element; and a control means for controlling the frequency of a sweep-out of unnecessary charge by the sweep-out means.

According to a second aspect of the present invention, there is provided an imaging apparatus having an imaging element for accumulating signal charge corresponding to an incident scene light flux in a photo-electric converting element section comprising: a sweep-out means for sweeping out unnecessary charge in the imaging element; an operating condition judging means for judging operating condition of the imaging apparatus; and a control means for controlling a frequency of the sweep-out of unnecessary charge by the sweep-out means on the basis of the output of the operating condition judging means.

The operating condition judging means judges at least one of consumed current, whether or not a mechanically driven part is being operated, the supply voltage level, the ambient temperature, whether or not the lens stop means is operative, whether or not the strobo means is being charged, and whether or not access operation of recording means is being performed.

According to a third aspect of the present invention, there is provided an imaging apparatus having an imaging element for accumulating signal charge corresponding to an incident scene light flux in a photo-electric converting element section comprising: a sweep-out means for sweeping out unnecessary charge in the imaging element; an operating condition judging means for judging consumed current of the imaging apparatus; and a control means for controlling a frequency of the sweep-out of unnecessary charge by the sweep-out means on the basis of the output of the operating condition judging means such that the consumed current will not exceed a predetermined value.

According to a fourth aspect of the present invention, there is provided an imaging apparatus having an imaging element for accumulating signal charge corresponding to an incident scene light flux in a photo-electric converting element section comprising: a sweep-out means for sweeping out unnecessary charge in the imaging element; an operating condition judging means for judging whether or not a mechanically driven part is being operated; and a control means for setting a lower sweep-out frequency of the sweep-out means when a mechanically driven part is being operated than a mechanically driven part is not being operated.

According to a fifth aspect of the present invention, there is provided an imaging apparatus having an imaging element for accumulating signal charge corresponding to an incident scene light flux in a photo-electric converting element section comprising: a sweep-out means for sweeping out unnecessary charge in the imaging element; an operating condition judging means for judging the supply voltage level; and a control means for setting a lower sweep-out frequency of the sweep-out means when the supply voltage level is lower than a predetermined voltage.

According to a sixth aspect of the present invention, there is provided an imaging apparatus having an imaging element for accumulating signal charge corresponding to an incident scene light flux in a photo-electric converting element section comprising: a sweep-out means for sweeping out unnecessary charge in the imaging element; an operating condition judging means for judging the ambient temperature; and a control means for controlling the sweep-out frequency of the sweep-out means on the basis of the result of judgment of the ambient temperature by the operating condition judging mean such as to reduce the sweep-out frequency when the ambient temperature is lower than a predetermined temperature.

The operating condition judging means for judging the ambient temperature is provided around (i.e. is located near to) the lens stop means or the power supply.

According to a seventh aspect of the present invention, there is provided an imaging apparatus having an imaging element for accumulating signal charge corresponding to an incident scene light flux in a photo-electric converting element section comprising: a lens stop means for stopping a light flux incident on the imaging element; a sweep-out means for sweeping out unnecessary charge in the imaging element; and a control means for controlling the sweep-out frequency of the sweep-out means such as to provide a lower sweep-out frequency when the lens stop means is operative than when the lens stop means is inoperative.

The control means reduces the sweep-out frequency of the sweep-out means when the lens stop means is operative so that the consumed current at this time is less than the maximum consumed current when the lens stop means is inoperative.

According to an eighth aspect of the present invention, there is provided an imaging apparatus having an imaging element for accumulating signal charge corresponding to an incident scene light flux in a photo-electric converting element section comprising: a strobo means for illuminating the scene incident on the imaging element; a sweep-out means for sweeping out unnecessary charge in the imaging element; and a control means for setting a lower sweep-out frequency of the sweep-out means when the strobo means is being charged than when the strobo means is not being charged.

According to a ninth aspect of the present invention, there is provided an imaging apparatus having an imaging element for accumulating signal charge corresponding to an incident scene light flux in a photo-electric converting element section comprising: a recording means for writing image data from the imaging element; and a control means for setting a lower sweep-out frequency of the sweep-out means during an access operation of the recording means to write image data than during a non-access operation of the recording means.

According to a tenth aspect of the present invention, there is provided an imaging apparatus having an imaging element for accumulating signal charge corresponding to an incident scene light flux in a photo-electric converting element section comprising: a sweep-out means for sweeping out unnecessary charge in the imaging element; an operating condition judging means for judging predetermined plurality of operating conditions of the imaging apparatus; and a control means for selecting a frequency of the sweep-out of unnecessary charge by the sweep-out means among a plurality of predetermined frequencies on the basis of the judged operating conditions.

The plurality of frequencies is set on the basis of number of the judged operating conditions.

The above as well as other objects and features will be clarified from the following description with reference to attached drawings.

PREFERRED EMBODIMENTS OF THE INVENTION

Preferred embodiments of the present invention will now be described with reference to the drawings.

Figure 1:
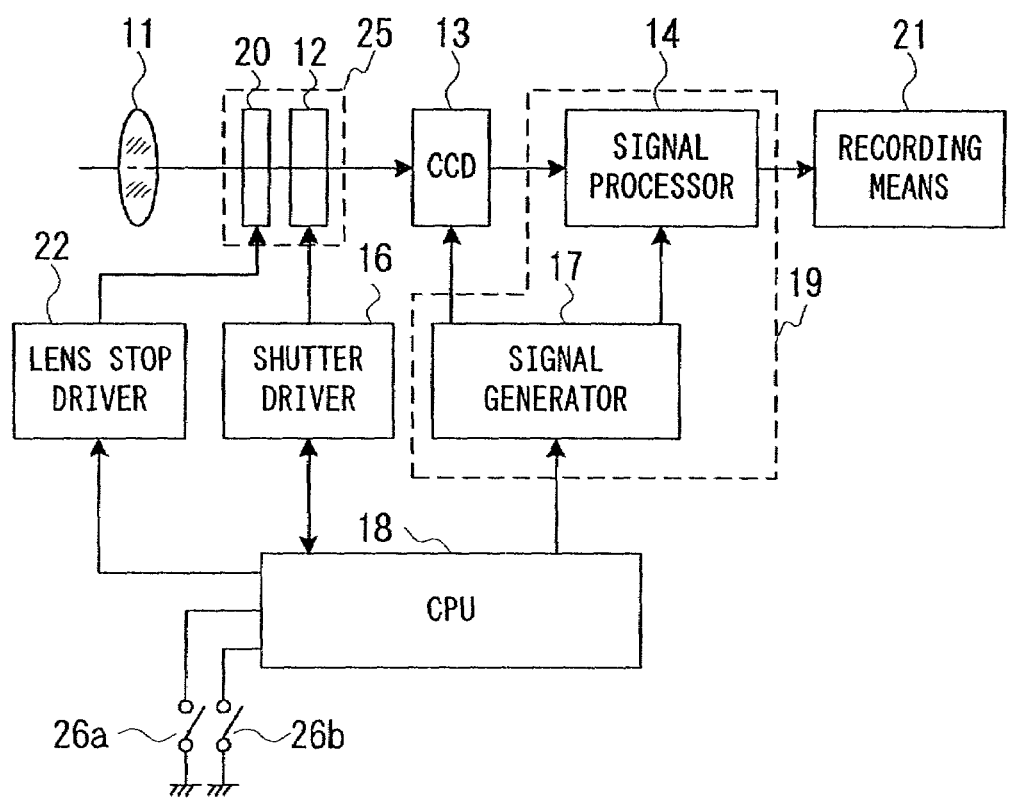
FIG. 1 shows a block diagram showing the construction of a first embodiment of the imaging apparatus according to the present invention.
Figure 16:
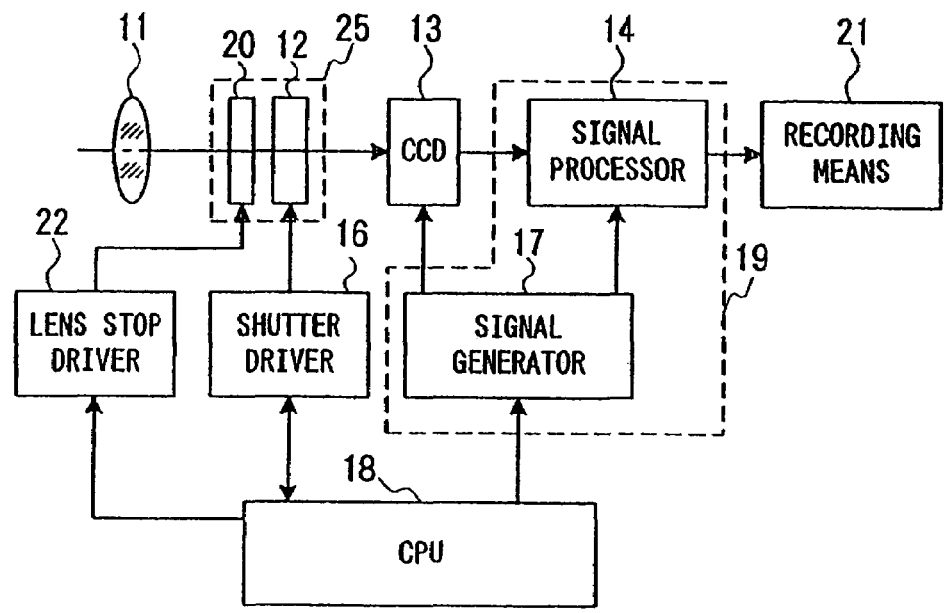
FIG. 16 shows a block diagram showing the construction of a prior art imaging apparatus.
Figure 19:
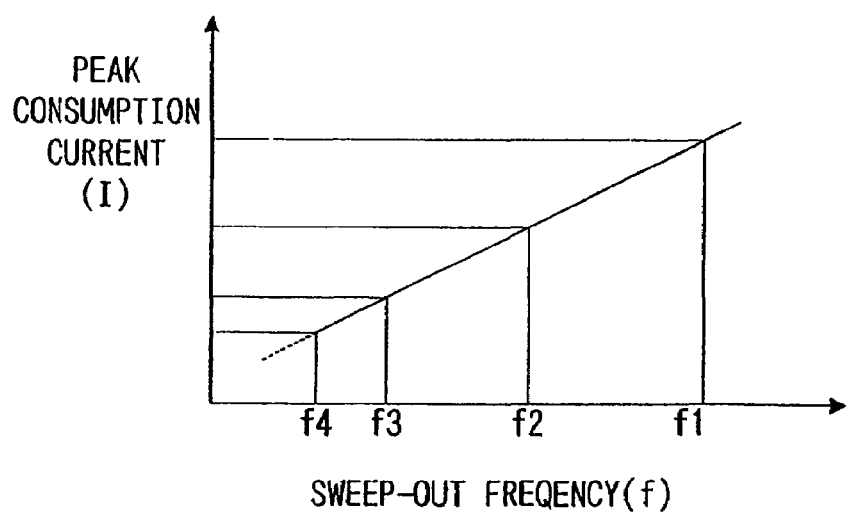
FIG. 19 shows a relationship between the sweep-out frequency of unnecessary charge and the consumed (consumption) current.
Figure 18:
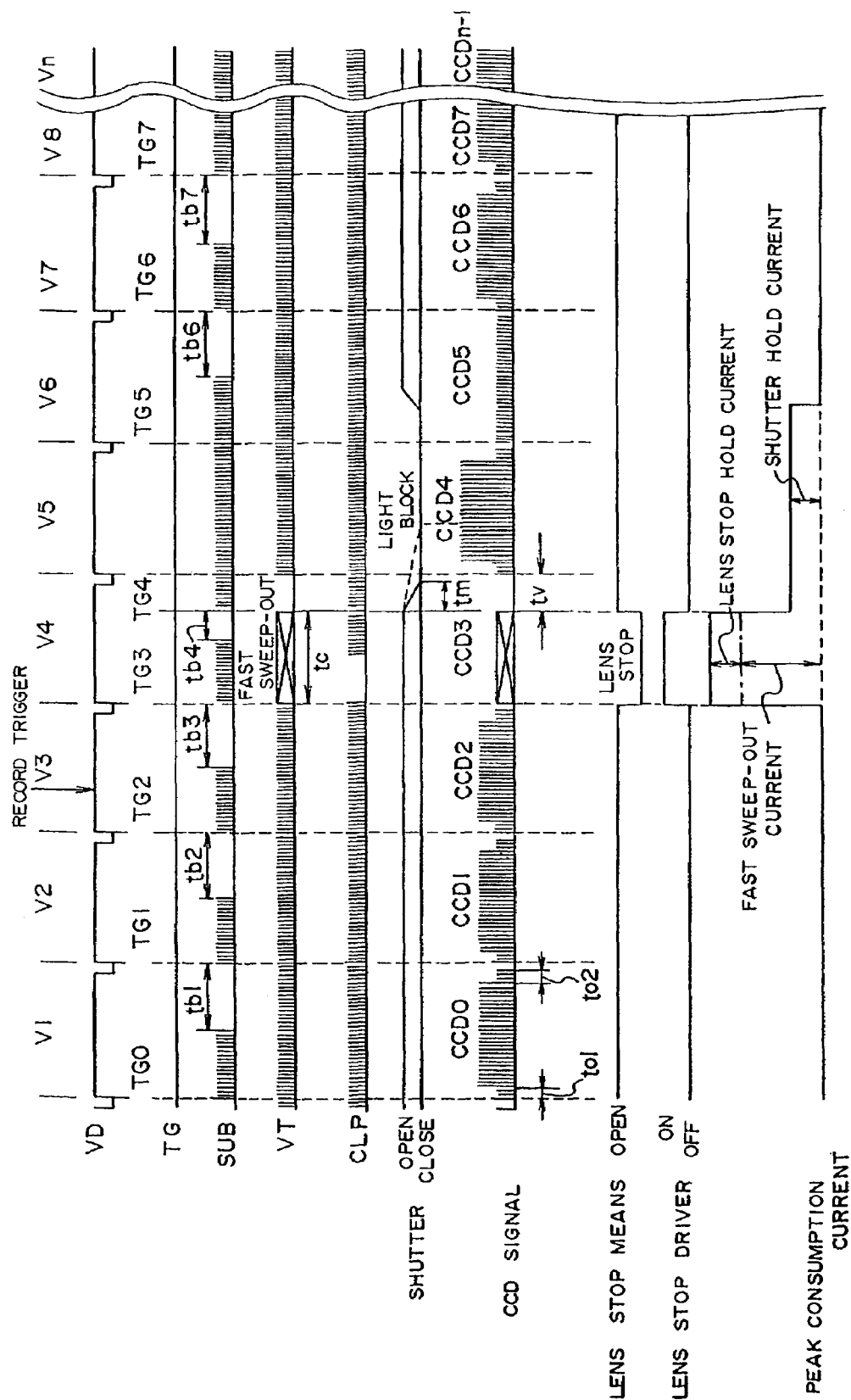
FIG. 18 shows a timing chart illustrating another conventional imaging operation in the imaging apparatus.

FIG. 1 is a block diagram showing a first embodiment of the imaging apparatus according to the present invention. In FIG. 1, parts having like functions in the imaging apparatus shown in FIG. 16 are designated by like reference numerals, and their detailed description is not given. This imaging apparatus basically operates in the same manner as described before in connection with the timing chart of FIG. 18. In this embodiment, however, the sweep-out frequency f for sweeping out unnecessary charge in the CCD 13 can be selectably set to either f1 or f2 (f1>f2) in the signal generator 17. Specifically, the signal generator 17 selectively outputs vertical shift register shift pulses VT at the sweep-out frequency f1 or f2 under control of the CPU 18 in dependence on whether or not the scene light flux is stopped by the lens stop means 20. The lens stop means 20 and the shutter means 12 are formed together to constitute a lens stop/shutter means 25. Furthermore, to the CPU 18 are connected a first release (1RSW) switch 26a, which generates a first trigger pulse in response to a first stage depression of a shutter release button (not shown), and a second release (2RSW) switch 26b, which generates a second trigger pulse, i.e., a recording trigger signal, in response to a second stage depression of the shutter release button.

Figure 2:
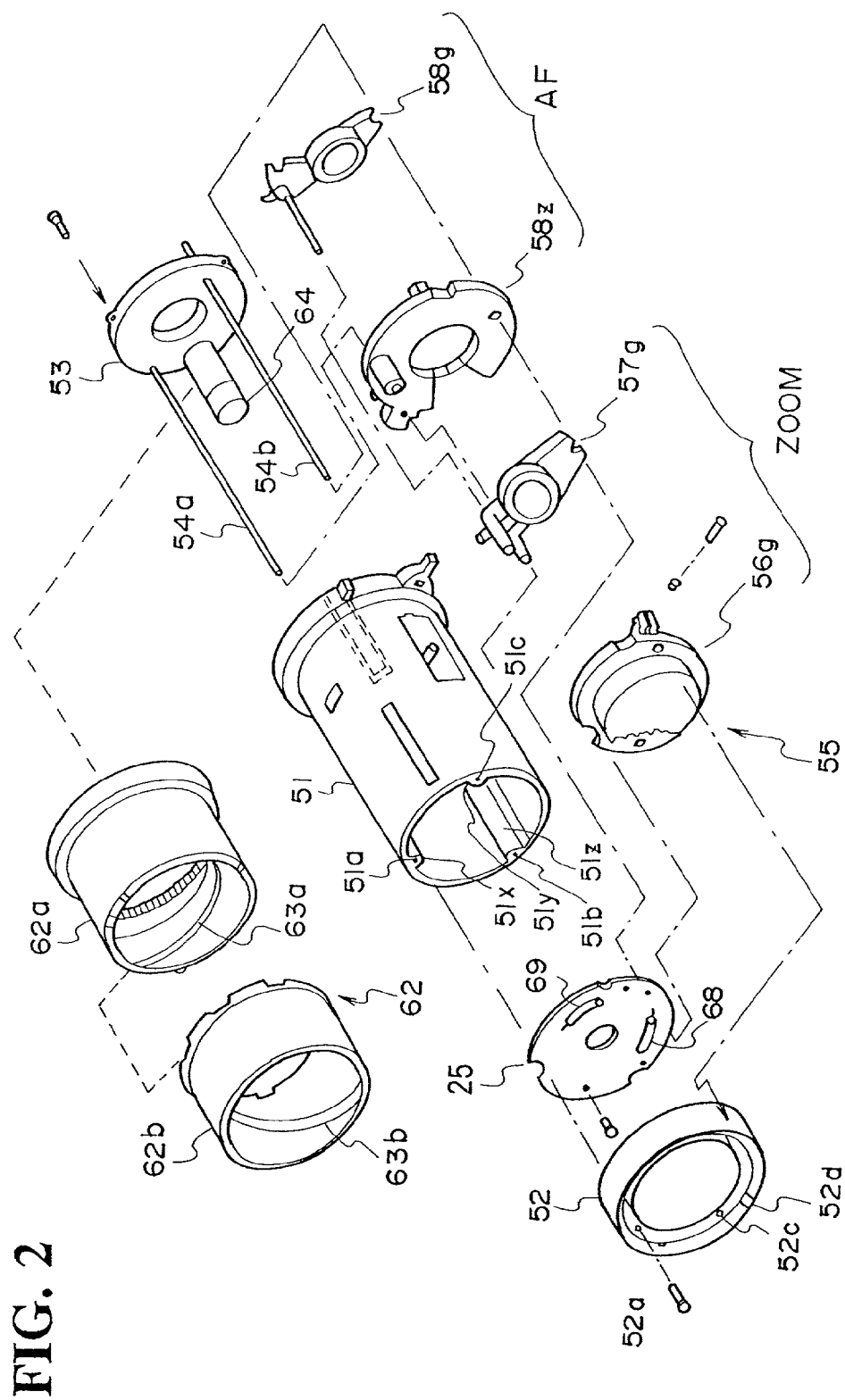
FIG. 2 shows an exploded perspective view showing an example of the construction of a frame unit including an optical system constituting the lens and the shutter means shown in FIG. 1.

FIG. 2 is an exploded perspective view showing an example of the construction of a frame unit including the lens stop/shutter unit 25 shown in FIG. 1. Referring to the Figure, illustrated centrally is a substantially cylindrical frame member 51 open at both ends. A fixed lens frame member 52 is secured by such securing means as screwing to the front open end of the frame member 51 on the left side (i.e., scene side) of the FIG. 2. A mounting base member 53 is also secured by such securing means as screwing to the rear open end of the frame member 51 on the right side (i.e., on the side of the CCD 13) in FIG. 2.

A pair of guide shafts 54a and 54b each have one end secured by bonding to the mounting base member 53 and the other end fittedly supported in an edge portion of the fixed lens frame member 52, and thus extends in the frame member 51 such as to be parallel with the optical axis. A plurality of movable frame members 55 (such as 56G, 57G and 58G) are provided in the frame member 51 such that they can be guided for their sliding in the optical axis direction along the pair guide shafts 54a and 54b.

The movable frame member 58G is movable in its state mounted on a support 58Z and together with the movable frame members 56G and 57G along the guide shafts 54a and 54b. For the sake of the brevity, optical parts with a lens are designated by reference numerals with a suffix G, and those without any lens are designated by numerals with a suffix Z. Although not exactly classified, the movable frame members 56G and 58G are provided mainly for zooming, and the movable frame members 58Z and 58G are provided for auto-focusing (AF). The movable frame members 58Z and 58G are brought closer together or away from each other for auto-focusing by an AF motor installed on the movable frame member 58Z.

The frame member 51 has a plurality of (i.e., three in this embodiment) ribs 51x, 51y and 51z formed on its inner surface such as to extend parallel with the optical axis. The ribs 51x, 51y and 51z extend from the front open end of the frame member 51 up to a position behind the position, at which a light flux controller for mechanically controlling the light flux passing through the movable frame members 55, i.e., the lens stop/shutter unit 25, is installed. The lens stop/shutter unit 25 is accommodated into the frame member 51 from the front open end thereof; it is accommodated by causing its sliding along the ribs 51x to 51z with its notches formed in an edge portion of a substantially disc-like base member thereof in engagement with the ribs 51a to 51z. The ribs 51x to 51z each have one end formed with each of threaded holes 51a to 51c for securing the fixed lens frame member 52 by screwing.

The fix lens frame member 52 has its inner periphery formed with a threaded groove 52d to permit detachable mounting of an optical part such as an adapter lens or a filter from the outside. The fix lens frame member 52 has an edge portion formed with screw insertion holes 52a to 52c, which correspond to the threaded holes 51a to 51c formed in the three ribs 51x to 51z at one end thereof. In FIG. 2, the screw insertion hole 52b is concealed and not shown.

A cam assembly 62 for causing advancement and retreat of the movable frame members 55 in the optical directions, is fitted for sliding revolution on the outer periphery of the frame member 51. The cam assembly 62 includes a first cam cylinder 62a having an inner peripheral convex cam 63a and a second cam cylinder 62b coupled to the first cam cylinder 62a and having an inner peripheral convex cam 63b. The first and second cam cylinders 62a and 62b are integrally revolved by the zoom motor 64 secured to the mounting substrate 53.

Figure 3:
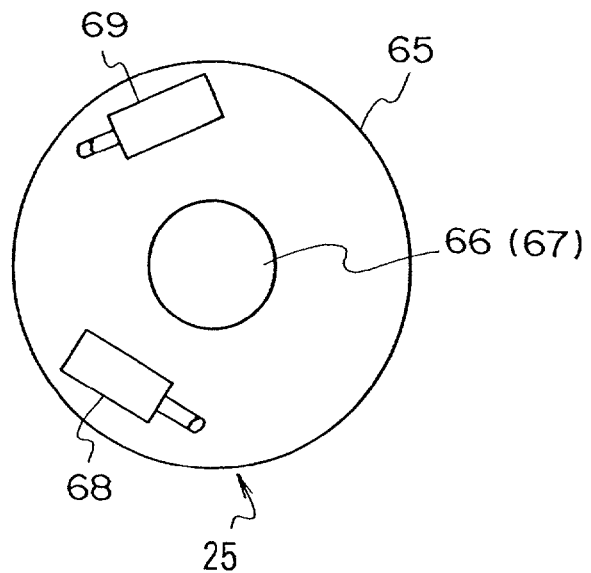
FIGS. 3(a) and 3(b) show the construction of a lens stop/shutter unit 25 shown in FIG. 2.
Figure 3:
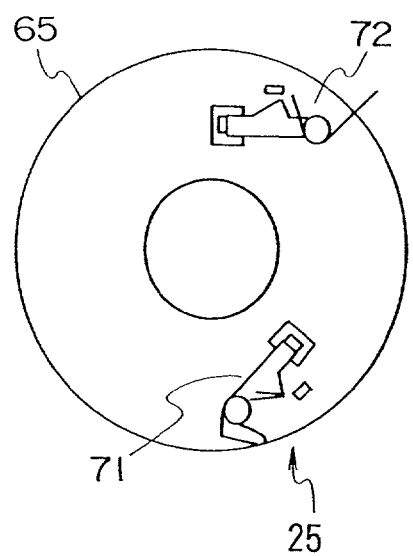

FIGS. 3(a) and 3(b) show the lens stop/shutter unit 25. As shown, the unit 25 includes a substantially disc-like base member 65, which is disposed in the frame member 51 such as to be perpendicular to the optical axis and having a central open-diameter aperture, and a lens stop member 66 and a shutter member 67 both provided in the base member. The lens stop member 66 is a thin member having a circular opening of a smaller diameter than the open diameter aperture of the base member 65. The shutter member 67 consists of two thin members. As shown in FIG. 3(a), a lens stop driver 68 and a shutter driver 69 are provided on one surface of the base member 65 such that they face each other. The stop and plunger drivers 68 and 69 both use solenoid plunger mechanisms.

As shown in FIG. 3(b), a lens stop lever 71 which is driven by the lens stop driver 68 for driving the lens stop member 66, and a shutter lever 72 which is driven by the shutter driver 69 for driving the shutter 67, are provided on the other surface of the base member 65. The stop and shutter levers 71 and 72 have the same shape.

In the lens stop-shutter unit 25 having the above construction, when the lens stop driver 22 (see FIG. 1) is not driven by the lens stop driver 68, the lens stop member 66 is concealed inside the base member 65, and the central open diameter aperture formed in the base member 65 serves the role of a fix stop. When the lens stop driver 62 is driven in this state, the lens stop lever 71 which has a portion in engagement with a solenoid plunger core is caused to undergo revolution. As a result, the lens stop member 66 coupled to a pin formed on the lens stop lever 71 is revolved to stop a part of the light flux through its circular opening. When the lens stop driver 68 is subsequently de-energized, the lens stop member 66 is restored to the initial position by a spring provided on a solenoid plunger core, thus providing the open-diameter aperture again.

When the shutter driver 69 is not driven by the shutter driver source 16 (see FIG. 1), the two leaves of the shutter member 67 are concealed inside the base member 65. When the shutter driver 69 is driven, the shutter lever 72 is caused to undergo revolution to cause the two shutter member leaves to block the light path. When the shutter driver 69 is subsequently de-energized, like the lens stop member 66, the shutter member 67 is retreated into the base member 65.

Figure 4:
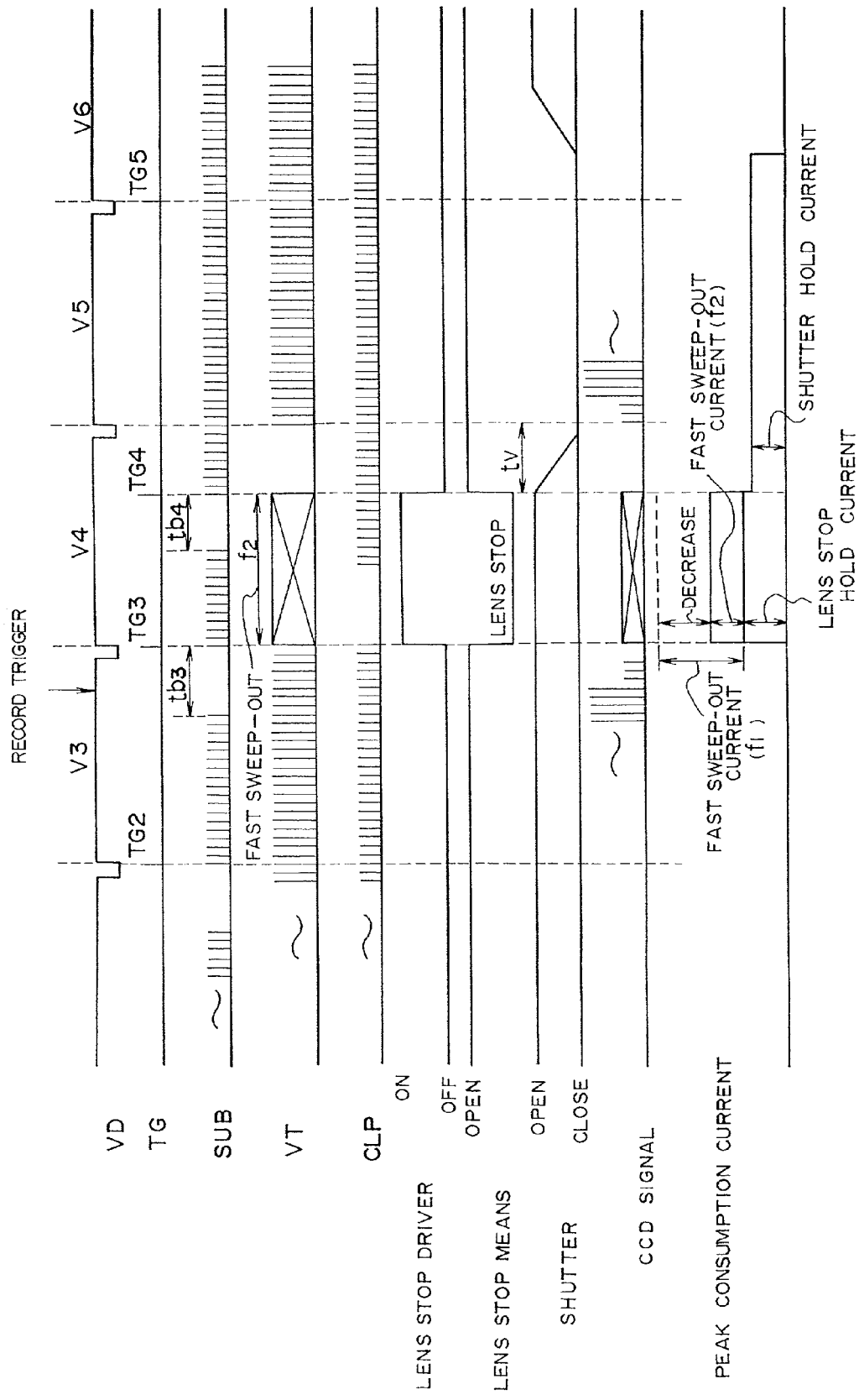
FIGS. 4 and 5 show timing charts illustrating the imaging operations in the first embodiment of the imaging apparatus.
Figure 5:
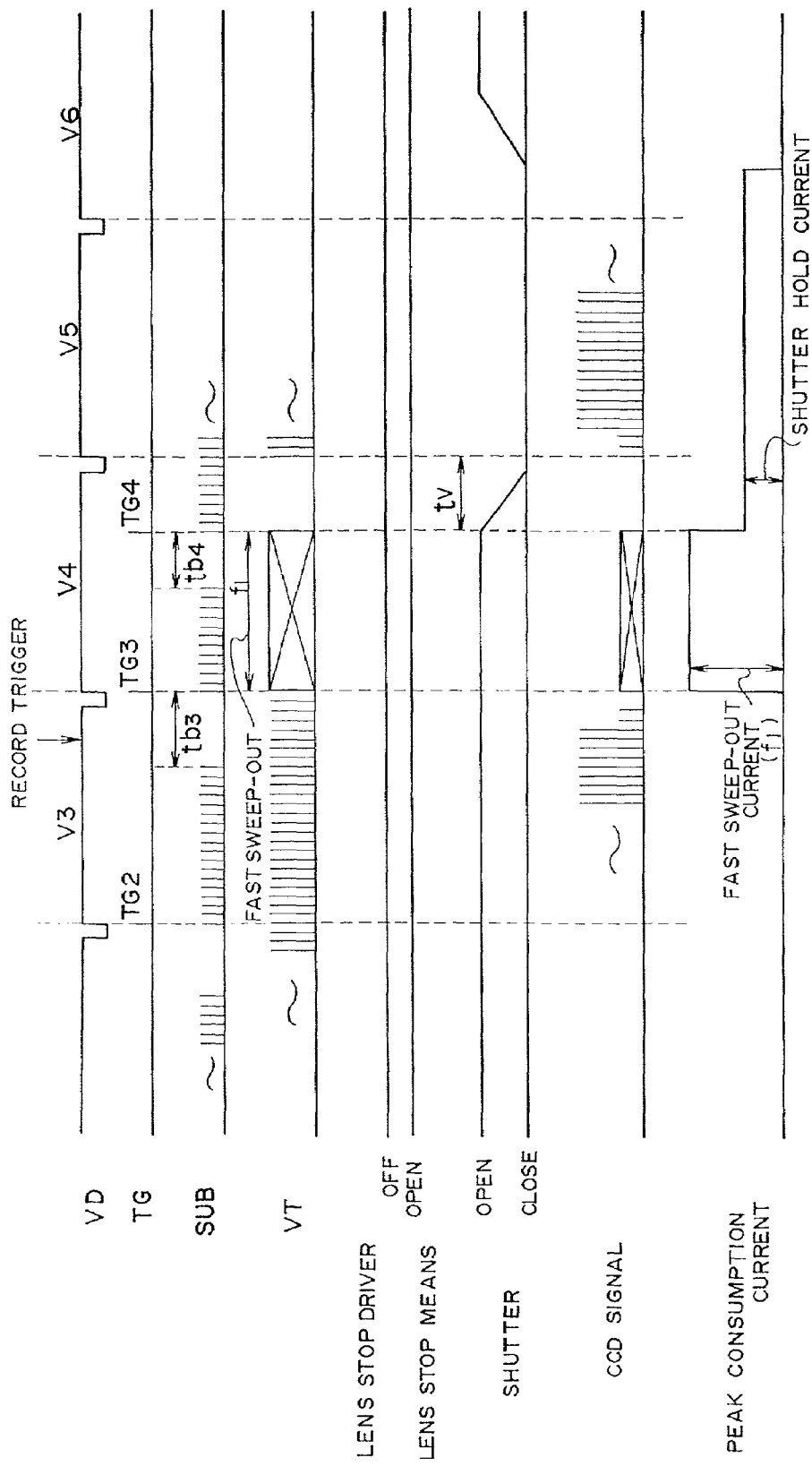
Figure 17:
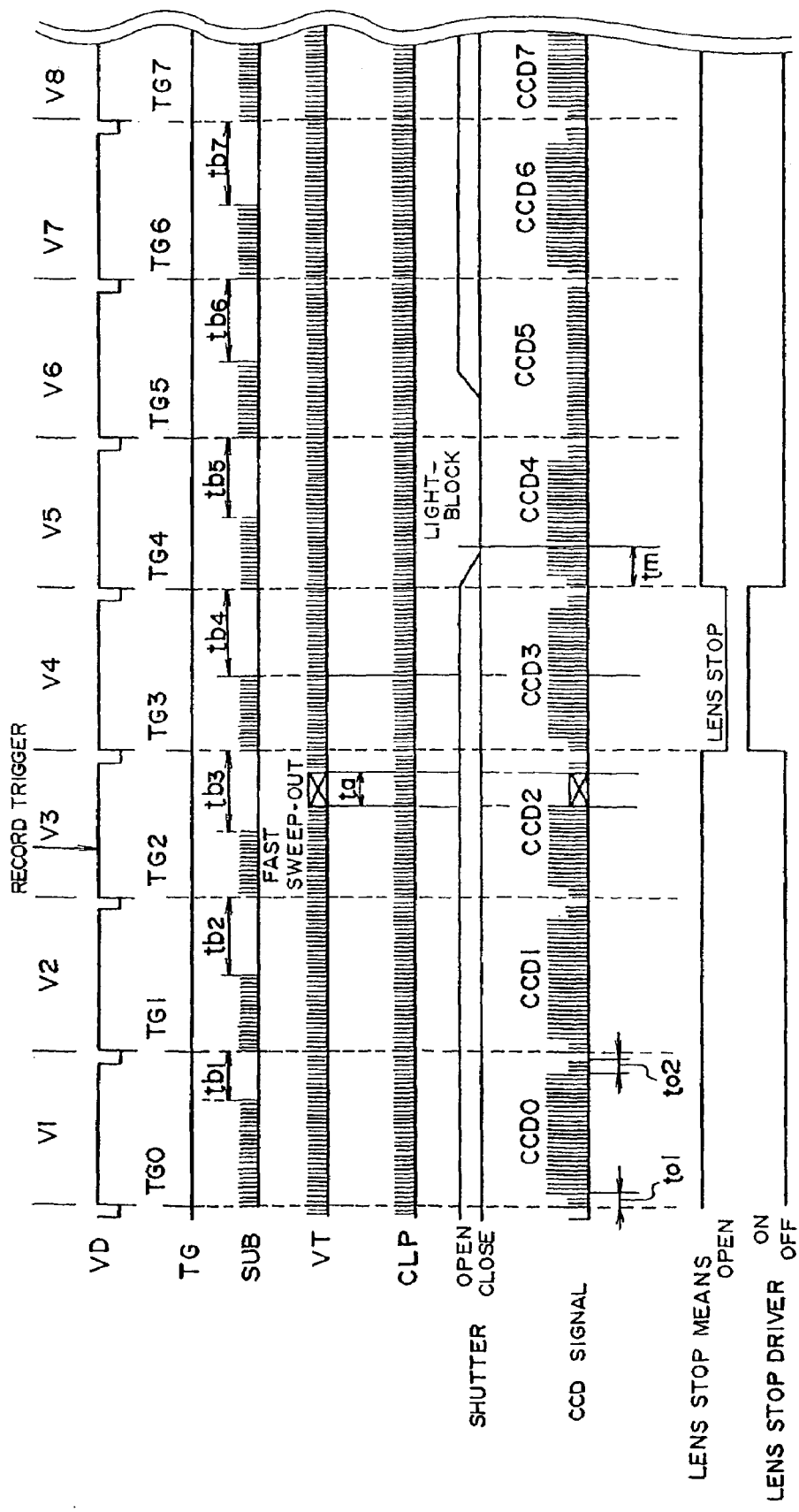
FIG. 17 shows a timing chart illustrating a conventional imaging operation in the imaging apparatus shown in FIG. 15.

FIGS. 4 and 5 are timing charts illustrating an essential part of the imaging operation in the first embodiment of the imaging apparatus. The FIG. 4 and 5 show the vertical sync signal VD, the transfer gate pulse train TG, the sub-pulse train SUB, the vertical shift register shift pulse train VT, the clamp pulse train CLP, the operation of the lens stop driver 22, the operation of the lens stop means 20, the operation of the shutter means 12 and the CCD signal as signal read out from the CCD 13 as described before regarding the functions in connection with FIG. 17. Here, the difference from the operation in the case of FIG. 18 will be mainly described.

In this embodiment, unnecessary charge in the CCD 13 is swept out by fast sweep-out in the period V4 subsequent to the generation of a recording trigger signal upon the turning-"on" of the 2RSW switch 26b after the turning-"on" of the 1RSW switch 26a, with or without concurrent scene flux stopping executed by driving the lens stop means 20 with the lens stop driver 22. In the case of stopping the scene flux, the signal generator 17 is caused to continuously output vertical shift register shift pulses VT at sweep-out frequency f2 (see FIG. 4). When the scene flux is not stopped, that is, when the signal charge is accumulated in the open-diameter aperture state without driving the lens stop means 20, the signal generator 17 is caused to continuously output vertical shift register shift pulses VT at sweep-out frequency f1 (f1>f2) (see FIG. 5). In FIG. 5, the response characteristic of the lens stop means 20 is not shown.

As shown, the signal generator 17 selectively provides the sweep-out frequency f for sweeping out unnecessary charge in the CCD 13; specifically, when the lens stop means 20 is driven for stopping the scene light flux, the fast sweep-out of unnecessary charge is executed at the sweep-out frequency f2 lower than the sweep-out frequency f1 which is set in the case when the lens stop means 20 is not driven. With the setting of the sweep-out frequency f2, the consumed power in the fast sweep-out operation time section can be reduced compared to the case of the sweep-out frequency f1. Thus, the overall peak consumed current during the fast sweep-out time section with the lens stop means 20 in the driven state, can be reduced substantially down to the same level as the consumed current in the sweep-out operation at the sweep-out frequency f1. It is thus possible to reduce the peak consumed current in the entire imaging apparatus, effectively permit consumed power reduction and battery life extension and effectively prevent the system stoppage by making the battery check.

Figure 6:
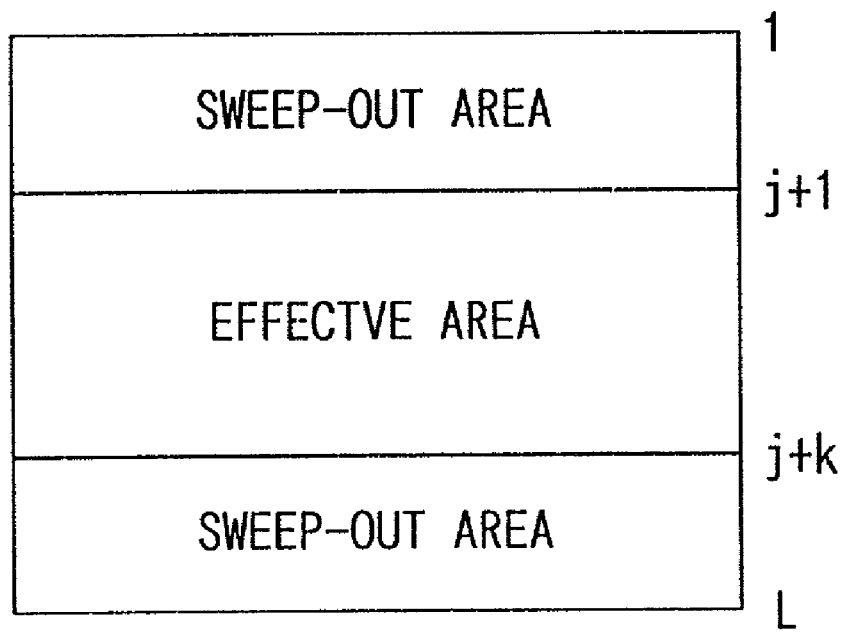
FIG. 6 shows a drawing for explaining the imaging operations in a second embodiment of the imaging apparatus.

A second embodiment of the present invention will now be described, which again uses the construction as shown in FIG. 1. In this embodiment, as the mode of reading out signal charge from the CCD 13 with the signal generator 17, in addition to the full pixel read-out mode, in which signal charge in the 1-st to the L-th (i.e., last) line of the CCD 13 is progressively read out as effective charge as described before, a k-line read-out mode can be set. Specifically, as shown in FIG. 6, a vertically continuous central k-line area of the light incidence surface from the (j+1)-th to the (j+k)-th line, is set as an effective area, while setting the remaining areas from the 1-st to the j-th line and from the (j+k+1)-th to the L-th line as sweep-out areas. In this mode, the signal charge is read out from the effective area pixels, while sweeping out charge in the sweep-out area pixels as unnecessary charge by the fast sweep-out. The CPU 18 selects these read-out modes in accordance with the operation of the 1RSW and 2RSW switches 26a and 26b for controlling the operation of reading out signal charge from the CCD 13.

Figure 7:
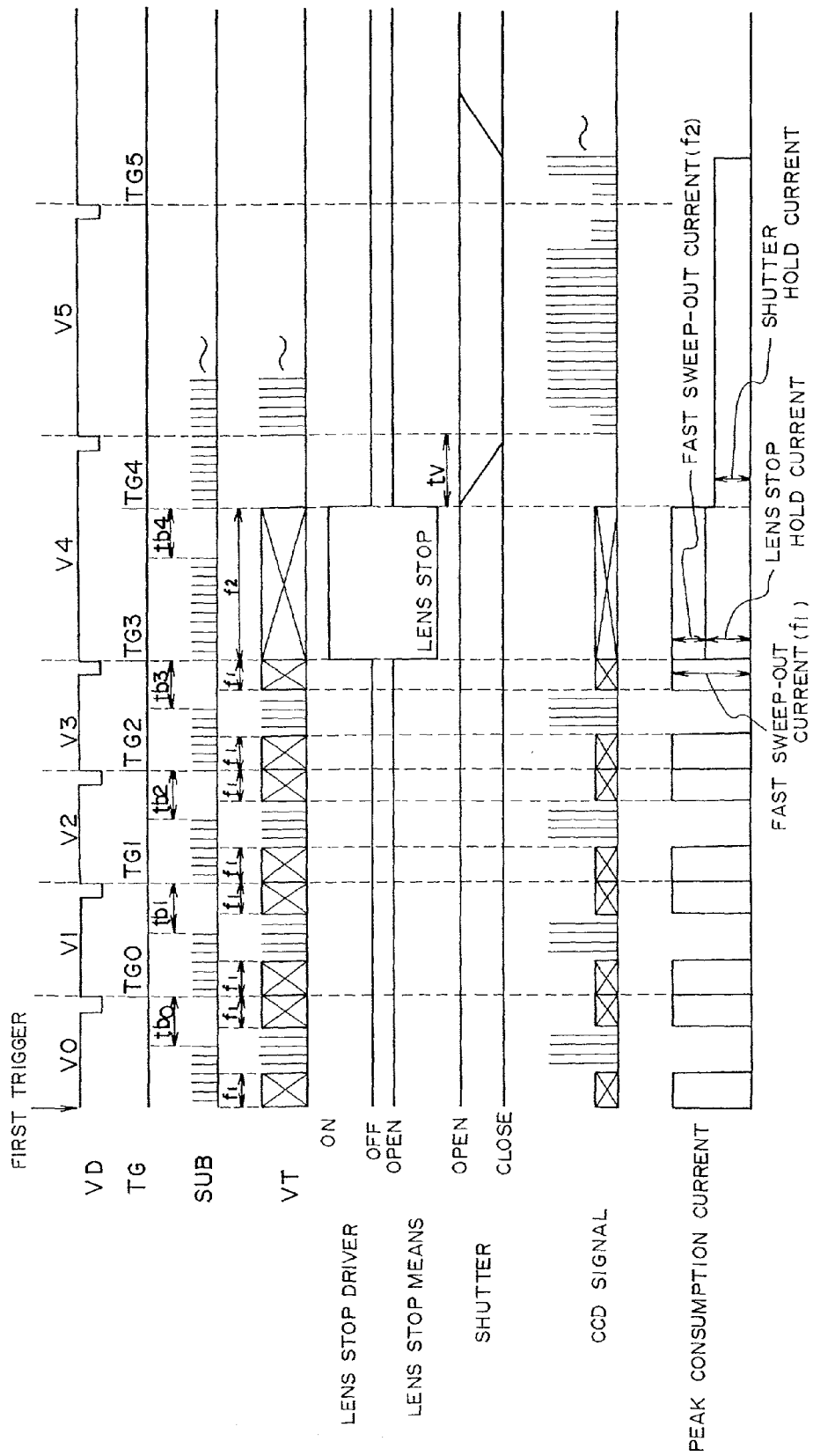
FIG. 7 shows a flow chart for explaining the operation of the second embodiment of the imaging apparatus.

Specifically, as shown in the timing chart of FIG. 7, upon generation of the first trigger pulse with the turning-"on" of the 1RSW switch 26a, the operation is started by selecting the k-line read-out mode. In this mode, a sweep-out operation of sweeping out unnecessary charge from the sweep-out area pixels in the CCD 13 by the fast sweep-out at the sweep-out frequency f1 and a read-out operation of reading out effective change from the pixels in the central continuous k-line effective area, are caused in synchronism with each period of the vertical sync signal VD. The k-line image data which is obtained as a result of the read-out in the k-line read-out mode, is used for such processes as auto-focusing (AF) control, auto-exposure (AE) control and auto-white-balance (AWB) control.

Figure 15:
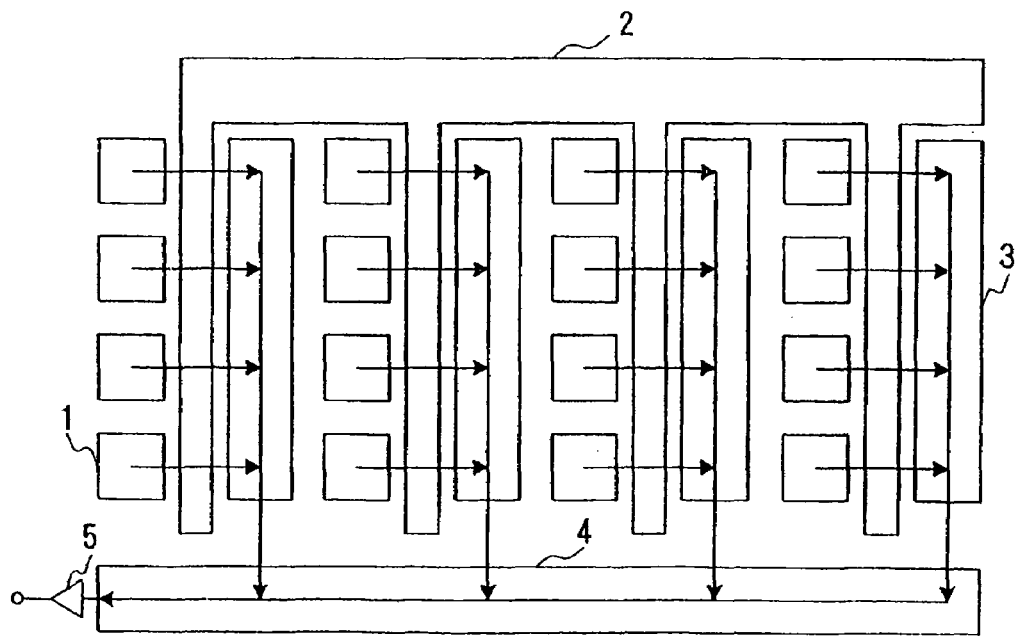
FIG. 15 shows an example of CCD as the imaging element applicable to the imaging apparatus of the present invention.

When the recording trigger signal is subsequently generated with the turning-"on" of the 2RSW switch 26b, from the next period (i.e., period V4 in the case of FIG. 7) the full pixel read-out mode is selected. Thus, like the case of the first embodiment, unnecessary charge in the vertical shift registers 3 (see FIG. 15) is swept out through the fast sweep-out by selecting the sweep-out frequency f2, lower than the sweep-out frequency f1, when the lens stop means 20 is driven while selecting the sweep-out frequency f1 when the lens stop means 20 is not driven, and in the next period V5 signal charge having been accumulated during the charge accumulation time section tb4 in the fast sweep-out time section is read out from all the pixels at a predetermined read-out frequency.

Thus, again in this embodiment the peak consumed current during the fast sweep-out time section when the lens stop means 20 is driven can be reduced, and the same effects as obtainable with the first embodiment can be obtained. Besides, in this embodiment, from the period V0 in which the first trigger pulse is generated till the period V3 in which the recording trigger signal is generated, the k-line read-out mode is selected to read out signal charge in the centrally continuous k-line effective area, while sweeping out unnecessary charge in the preceding and succeeding sweep-out areas by the fast sweep-out at the sweep-out frequency f1. The frame rate in these periods thus can be improved. It is thus possible to reduce the release time lag from the first trigger pulse till the recording trigger signal, thus reducing the possibility of missing a shutter chance.

Figure 8:
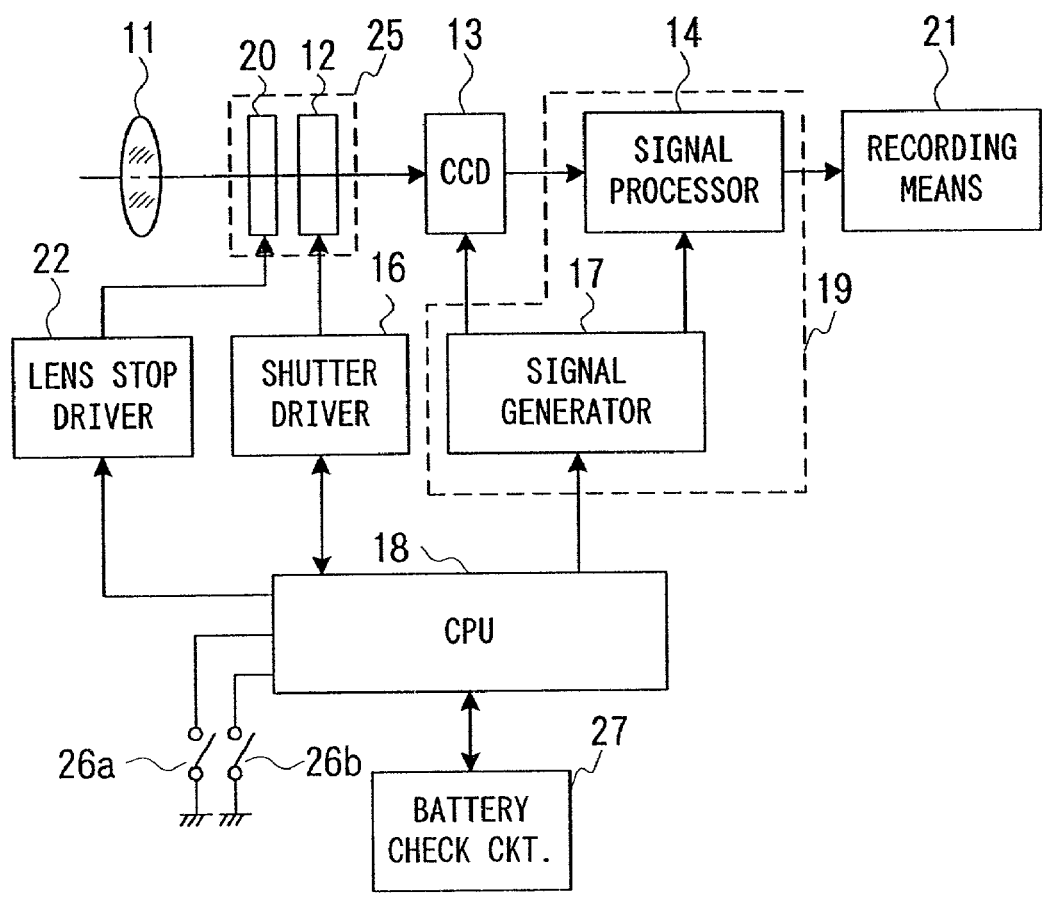
FIG. 8 shows a block diagram showing the construction of a third embodiment of the imaging apparatus according to the present invention.

FIG. 8 is a block diagram showing the construction of a third embodiment of the imaging apparatus according to the present invention. This embodiment is constructed by connecting a battery checker 27, which checks the residual capacity of a battery (not shown) (i.e., the supply voltage level), to the CPU 18 in the construction of the second embodiment. In the k-line read-out mode after the first trigger pulse generation, the CPU 18 controls the signal generator 17 according to the output of the battery checker 27 to cause the signal generator 17 to selectively output vertical shift register shift pulses VT at sweep-out frequency f1 or f2 (f1>f2) for controlling the operation of sweeping out unnecessary charge in the sweep-out areas. In the full pixel read-out mode after the recording trigger signal generation, for the unnecessary charge sweep-out control, the CPU 18 controls the signal generator 17 according to whether the light flux stop is provided by the lens stop means 20 as well as to the output of the battery checker 27, thus causing the signal generator 17 to selectively output vertical shift register shift pulses VT at the sweep-out frequency f1 or f2. For the remainder of the construction and operations, the embodiment is the same as the second embodiment, and here the difference in operation from the second embodiment will be mainly described. The battery checker 27 has a function of checking the residual battery capacity under control of the CPU 18 and also a function of always monitoring the residual battery capacity and, upon detection that the residual battery capacity becomes lower than a predetermined reference level (VBCO), stopping the system by resetting the CPU 18 for preventing run-away.

Figure 9:
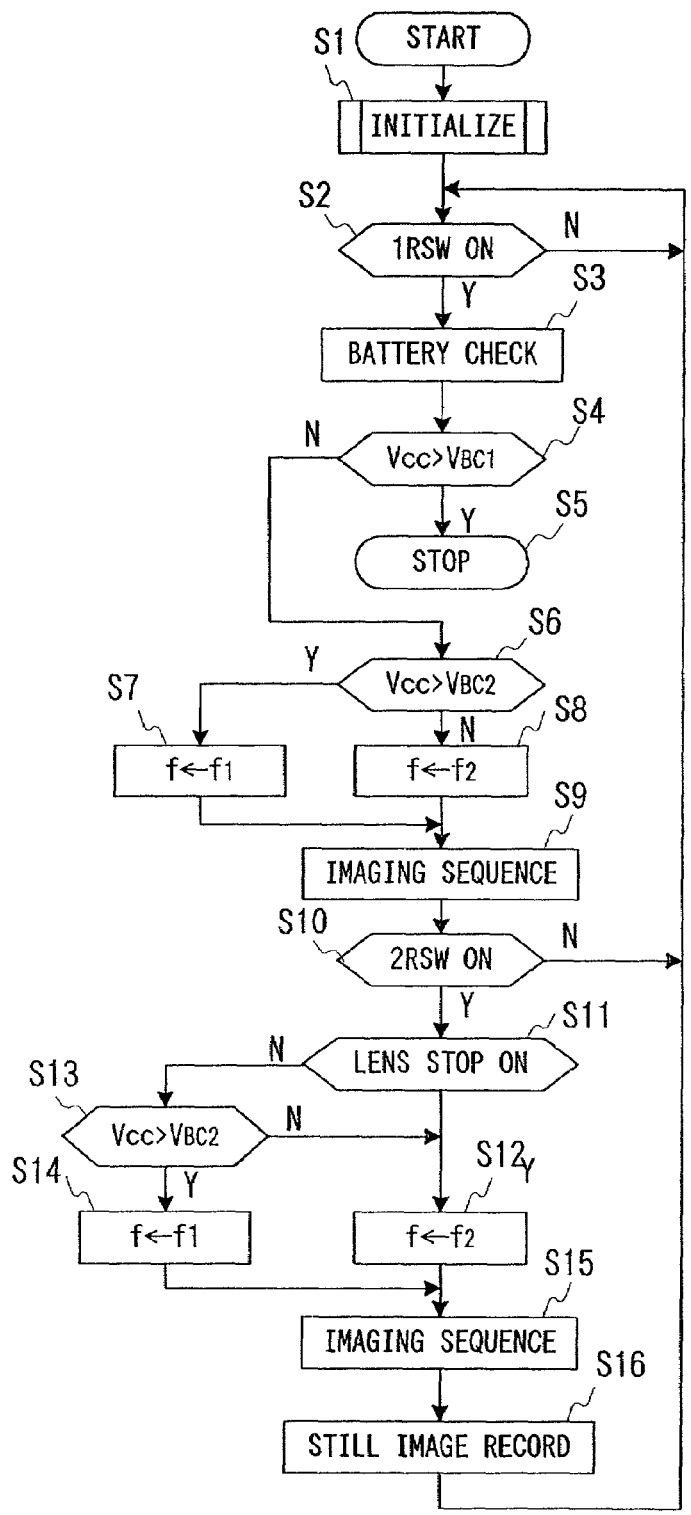
FIG. 9 shows a flow chart for explaining the operation of the third embodiment of the imaging apparatus.

FIG. 9 is a flow chart illustrating the main routine executed by the CPU 18 in the third embodiment. The main routine is started with power-"on" of the system. When the main routine is started, the CPU 18 first executes initial setting (step S1), and then waits for the operation of turning on the 1RSW switch 26a (step S2).

When the CPU 18 detects in the step S2 that the 1RWS switch 26a has been turned on, it causes a battery check by the battery checker 27 (step S3). Then the CPU 18 compares the detected supply voltage level Vcc with a predetermined first reference level VBC1 (step S4). The first reference level VBC1 is, for instance, substantially the lower limit of an operation voltage level range, and is set to be slightly higher than the above reference level VBCO, at which the CPU 18 is reset.

When the CPU 18 detects in the step S4 that Vcc<VBC1, it judges that the battery has been used up and can no longer be used, and sets a stop mode to provide an inoperative state of itself (step S5). In this case, it is displayed on a liquid crystal display (not shown) or the like that the battery can no longer be used. When the CPU 18 finds that Vcc≧VBC1, it compares the detected voltage level Vcc with a predetermined second reference level VBC2 (VBC1>VBC2) (step S6). The second reference level VBC2 is set to be, for instance, substantially the mid voltage level in the operation guaranteeing voltage level range.

When the CPU 18 detects in the step S6 that Vcc>VBC2, it sets the sweep-out frequency f, at which to sweep out unnecessary charge in the sweep-out areas in the k-line read-out mode, to f1 (step S7). When the CPU 18 detects that VCC≦VBC2, it sets the frequency f to f2 (step S8). The CPU 18 then executes an imaging sequence in the k-line read-out mode to obtain image data for executing such processes as AF control, AE control and AWB control (step S9).

Subsequently, the CPU 18 checks whether the 2RSW switch 26b has been turned on (step S10). When the CPU 18 detects that the switch is "off", the routine goes back to the step S2 to repeat the operation as described. When the CPU 18 detects that the switch has been turned on, it checks, according to the result of exposure computation in the AE control executed in the step S9, whether the lens stop means 20 will be turned on (step S11).

When the CPU 18 detects in the step S11 that the lens stop means 20 will be turned on, it sets the sweep-out frequency f in the full pixel read-out mode to f2 (step S12). When the CPU 18 detects that the lens stop means 20 will be continually held "off", it checks whether Vcc>VBC2 (step S13). When Vcc>VBC2, the CPU 18 sets the sweep-out frequency f to f1 (step S14). When Vcc≦VBC2, the CPU 18 sets f2 (step S12). The CPU 18 then executes the imaging sequence in the full pixel read-out mode, that is, the operation in the period V4 and following periods in FIG. 7 (step S15), and records the obtained image data as a still image in the recording means 21 (step S16). The routine then returns to the step S2.

As shown above, in this embodiment the sweep-out frequency f is selectively set to f1 or f2 in dependence on the result of the residual battery capacity check in the battery checker 27. Specifically, when it is detected that Vcc≦VBC2, the sweep-out frequency for sweeping out the charge in the sweep-out areas in the k-line read-out mode is set to the lower frequency f2, and also the sweep-out frequency f in the full pixel read-out mode is set to the lower frequency f2 for sweep-put control irrespective of the operation of the lens stop means 20. Thus, in addition to the effects obtainable in the second embodiment, the consumed current can be reduced when the residual battery capacity is less. It is thus possible to more effectively permit the battery life extension and more effectively prevent the system stoppage by making the battery check.

Figure 10:
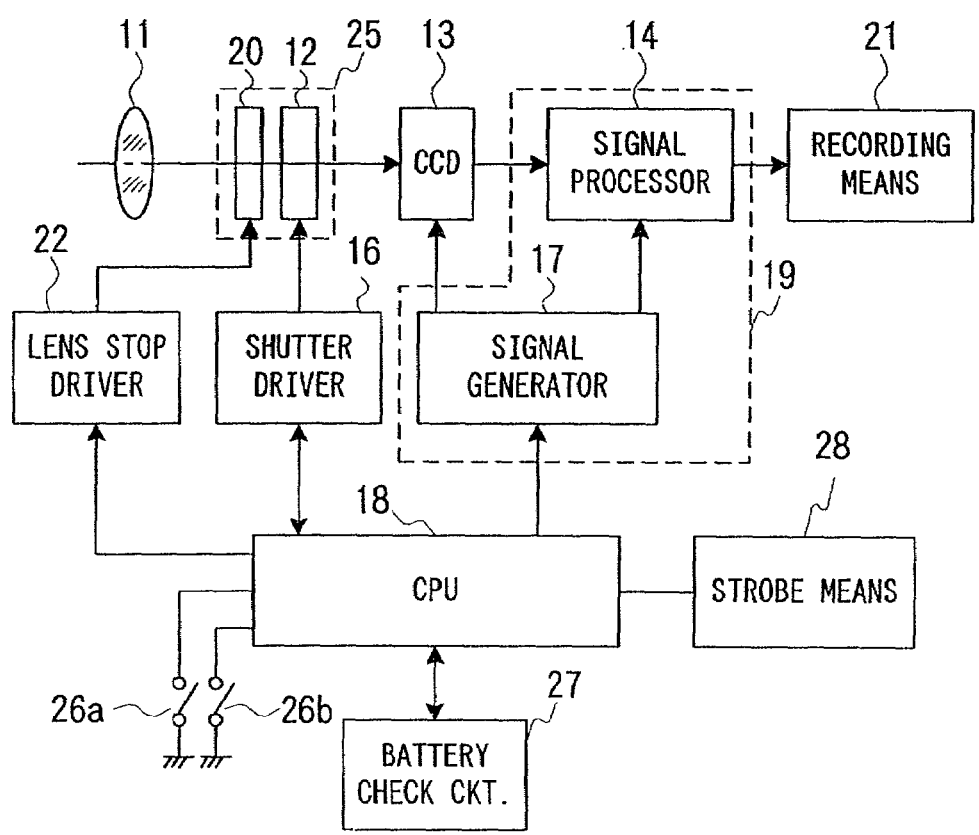
FIG. 10 shows a block diagram showing the construction of a fourth embodiment of the imaging apparatus according to the present invention.

FIG. 10 is a block diagram showing the construction of a fourth embodiment of the imaging apparatus according to the present invention. In this embodiment, a strobo means 28 for illuminating the scene is further provided in connection to the CPU 18 in the construction of the third embodiment. In the k-line read-out mode after the first trigger pulse generation, the CPU 18 controls the signal generator 17 according to whether the strobo means 20 is being charged as well as to the result of check in the battery checker 27, thus causing the signal generator 17 to selectively output vertical shift register shift pulses VT at the sweep-out frequency f1 or f2 (f1>f2) for controlling the operation of sweeping out unnecessary charge in the sweep-out areas. For the unnecessary charge sweep-out operation control in the full pixel read-out mode that is set after the recording trigger signal generation, like the third embodiment, the CPU 18 controls the signal generator 17 according to the whether the lens stop means 20 is driven for stopping the scene light flux and also to the output of the battery checker 27 to cause the signal generator 17 to selectively output vertical shift register shift pulses VT at the sweep-out frequency f to f2. For the remainder of the construction and the operation, this embodiment is the same as the second embodiment, and here the difference in operation from the third embodiment will be mainly described.

Figure 11:
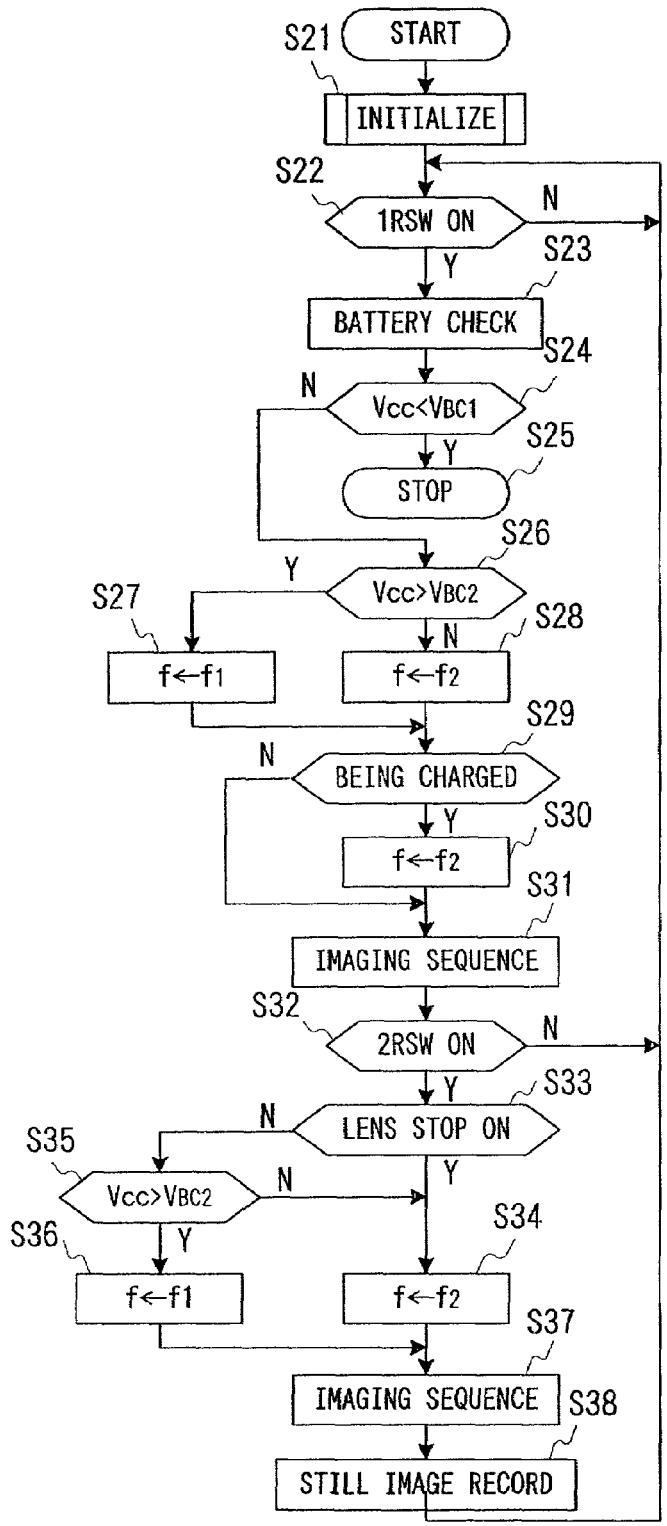
FIG. 11 shows a flow chart for explaining the operation of the fourth embodiment of the imaging apparatus.

FIG. 11 is a flow chart illustrating the main routine executed by the CPU 18 in the fourth embodiment. When the main routine is started with power-"on" of the system, the CPU 18 first executes initial setting (step S21), and waits for turning-"on" of the 1RSW switch 26a (step S22). When the CPU 18 detects that the 1RSW switch 26a has been turned on, it causes a battery check (step S23). Then the CPU 18 compares the supply voltage level Vcc and the first reference level VBC1 (step S24), and when Vcc<VBC1 it sets a stop mode of bringing about an inoperative state of itself (step S25). When Vcc≧VBC1, the CPU 19 compares Vcc with the second reference level VBC2 (step S26).

When the CPU 18 detects in the step S26 that Vcc>VBC2, it sets the sweep-out frequency f for sweep-out area unnecessary charge sweeping in the k-line read-out mode to f1 (step S27). When Vcc≦VBC2, the CPU 18 sets f2 (step S28). Then, the CPU 18 checks whether the strobo means 28 is being charged (step S29). When the strobo means 28 is being charged, the CPU 18 sets the sweep-out frequency f to f1 irrespective of whether this frequency f1 has been set in the step S27 (step S30). When the strobo means 28 is not being charged, the CPU 18 executes an imaging sequence in the k-line read-out mode at the sweep-out frequency f set in the step S27 or S28 to obtain image data used for such processes as AF control, AE control and AWB control (step S31).

In subsequent steps S32 to S38, the CPU 18 executes the same processes as in the steps S10 to S16 in the third embodiment shown in FIG. 9, and records a still image in the recording means 21. The routine then returns to the step S22.

As shown, in this embodiment, during the charging of the strobo means 20 the sweep-out area unnecessary charge sweep-out frequency f in the k-line read-out mode is set to f2 lower than f1. Thus, like the previous embodiments the peak consumed current in the entire system can be reduced, thus effectively permitting power consumption reduction and battery life extension and more effectively preventing the system stoppage by the battery check.

Figure 12:
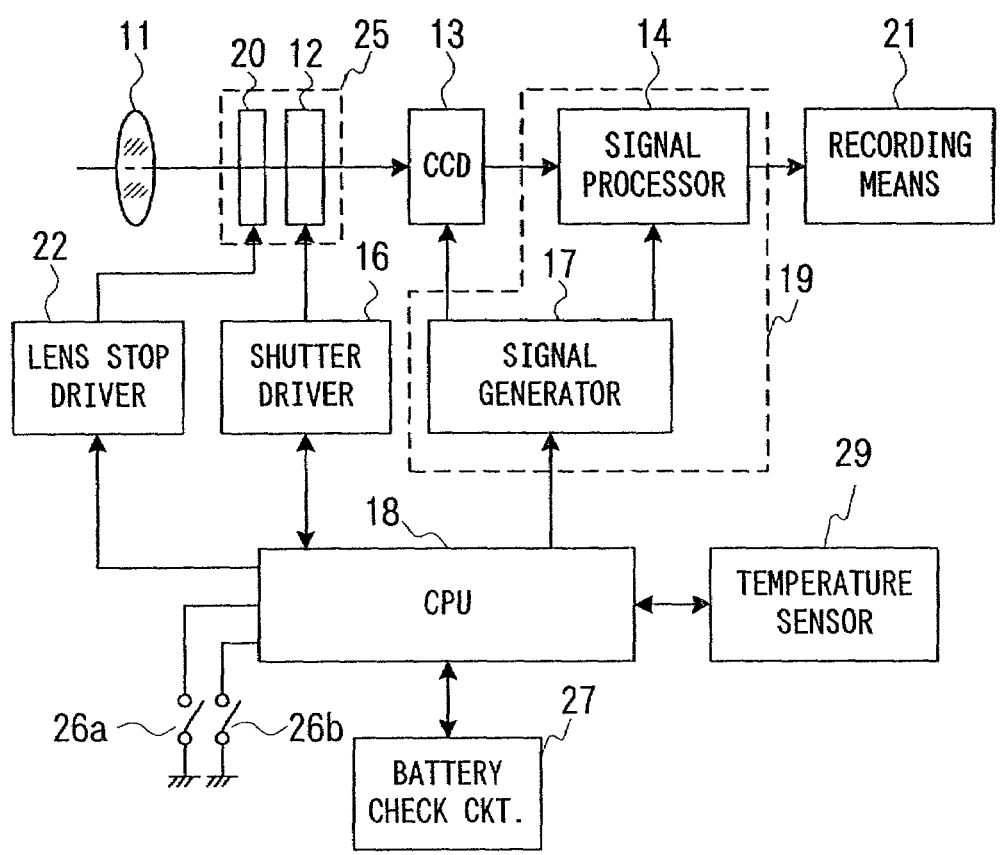
FIG. 12 shows a block diagram showing the construction of a fifth embodiment of the imaging apparatus according to the present invention.

FIG. 12 is a block diagram showing the construction of a fifth embodiment of the imaging apparatus according to the present invention. In this embodiment, a temperature sensor 29 for detecting the ambient temperature Ta is further provided in connection to the CPU 18 in the construction of the third embodiment. The temperature sensor 29 is a thermistor or the like, and is preferably disposed near the lens stop means 20 or the battery. In addition, the sweep-out frequency f for sweeping out unnecessary charge in the CCD 13 with the signal generator 17 can be selectively set to f1, f2, f3 or f4 (f1>f2>f3>f4). In the k-line read-out mode after the first trigger pulse generation, the CPU 18 controls the signal generator 17 according to the check result in the battery checker 27 and also to the ambient temperature Ta detected by the temperature sensor 29 to cause the signal generator 17 to selectively output vertical shift register shift pulses VT at sweep-out frequency f1, f2 or f3 (f1>f2), thus effecting the control of the sweep-out area unnecessary charge sweep-out operation. In the full pixel readout mode after the recording trigger signal generation, for the unnecessary charge sweep-out operation the CPU 18 controls the signal generator 17 according to the ambient temperature Ta detected in the temperature sensor 29, the provision or non-provision of the scene light flux stopping by the lens stop means 20 and the check result in the battery checker 27 to cause the signal generator 17 to selectively output vertical shift register shift pulses VT at a selected one of the sweep-out frequencies f1 to f4. For the remainder of the construction and the operation, this embodiment is the same as the third embodiment, and here the difference in operation from the third embodiment will be mainly described.

Figure 13:
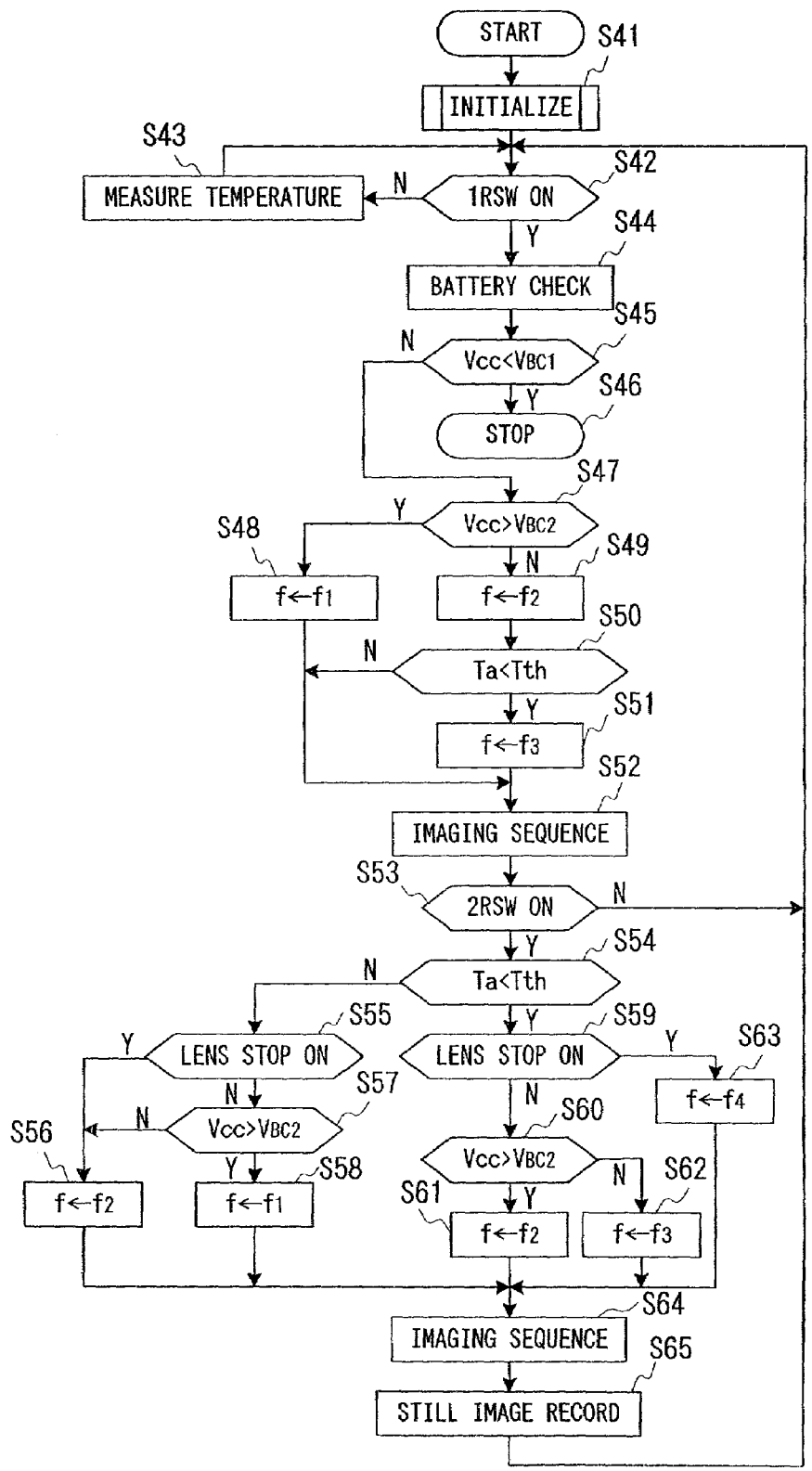
FIG. 13 shows a flow chart for explaining the operation of the fifth embodiment of the imaging apparatus.

FIG. 13 is a flow chart illustrating a main routine executed by the CPU 18 in the fifth embodiment. When the main routine is started with power-"on" of the system, the CPU 18 executes initial setting (step S41), and waits for the turning-"on" of the 1RSW switch 26a (step S42). Until the 1RSW switch 26a is turned on, the CPU 18 measures the ambient temperature Ta by reading out the output of the temperature sensor 29 (step S43).

When the CPU 18 detects in the step S42 that the 1RSW switch 26a has been turned on, it causes a battery check (step S44), and compares the supply voltage level Vcc and the first reference level VBC1 (step S45). When Vcc<VBC1, the CPU 18 sets a stop mode, to bring about an inoperative state of itself (step S46). When Vcc≧VBC1, the CPU 18 compares Vcc and the second reference level VBC2 (step S47).

When the CPU 18 detects in the step S47 that Vcc>VBC2, it sets the sweep-out area unnecessary charge sweep-out frequency f in the k-line read-put mode to f1 (step S48). When Vcc≦VBC2, the CPU 18 sets f2 (step S49). The CPU 18 then compares the detected ambient temperature Ta and reference temperature Tth (step S50). When Ta<Tth, the CPU 18 sets f3 as the sweep-out frequency f irrespective of the sweep-out frequency setting in the step S48 or S49 (step S51). When Ta≧Tth, the CPU 18 executes an imaging sequence in the k-line read-out mode at the sweep-out frequency f that has been set in the step S48 or S49 to obtain image data for such processes as AF control, AE control and AWB control (step S52).

Subsequently, the CPU 18 checks whether the 2RSW switch 26b has been turned on (step S53). When this switch is "off", the CPU 18 returns to the step S42 and repeats the operation as described. When the CPU 18 detects that the switch has been turned on, it checks whether Ta<Tth (step S54). When Ta≧Tth, the CPU 18 executes steps S55 to S58, which are the same processes as the steps S11 to S14 in the third embodiment shown in FIG. 9, that is, it sets either f1 for f2 as the unnecessary charge sweep-out frequency f in the full pixel read-out mode according to whether the lens stop means 20 will be turned on and also to the residual battery capacity Vcc.

When the CPU 18 detects in the step S54 that Ta<Tth, it checks whether the lens stop means 20 will be turned on (step S59). When the lens stop means 20 will not be turned on, the CPU 18 further checks whether Vcc>VBC2 (step S60). When Vcc>VBC2, the CPU 18 sets f2 as the unnecessary charge sweep-out frequency f in the full pixel read-out mode (step S61). When Vcc≦VBC2, the CPU 18 sets f3 (step S61). When the CPU 18 judges in the step S59 that the lens stop means 20 will be turned on, it sets f4 as the sweep-out frequency f (step S63).

After selectively setting the sweep-out frequency f in the full pixel read-out mode among the four frequencies f1 to f4 in the above way, the CPU 18 executes an imaging sequence in the full pixel read-out mode by using the selected sweep-out frequency (step S64), and records image data thus obtained as a still image in the recording means 21 (step S65). The routine then returns to the step S42.

As shown, in this embodiment, the sweep-out frequency f is set by taking the ambient temperature Ta as well as the residual battery capacity Vcc into considerations. Specifically, in the case of Vcc≦VBC2 and also Ta<Tth resulting in battery capacity reduction, in the k-line read-out mode the sweep-out frequency f is set to the still lower frequency f3 for sweeping out sweep-out area unnecessary charge by the fast sweep-out, and in the full pixel read-out side it is in dependence on whether the lens stop means 20 will be turned on, that is, it is set to f3 when the lens stop means 20 will not be turned on and to the yet lower frequency f4 when the lens stop means will be turned on, for sweeping out unnecessary charge by the fast sweep-out. Thus, like the previous embodiment, the peak consumed current in the entire system can be reduced to effectively permit power consumption reduction and battery life extension and also effective prevention of the system stoppage by the battery check.

The embodiments described above are by no means limitative, and various changes and modifications of the embodiments are possible according to the present invention. For example, the fourth and fifth embodiments may be combined such that when Vcc≦VBC2, Ta<Tth and the strobo means 28 is being charged, in the k-line read-out mode the sweep-out frequency f may be set to the yet lower frequency f4 for sweeping out sweep-out area unnecessary charge by the fast sweep-out.

Also, it is possible to control the sweep-out frequency by taking into considerations whether such an access operation as writing image data in the recording means 21 will be executed. For example, the sweep-out frequency may be set to a lower frequency during an access operation than when no access operation prevails. In this way, it is possible to effectively prevent loss of image data due to system stoppage during writing of image data in the recording means 21.

Figure 14:
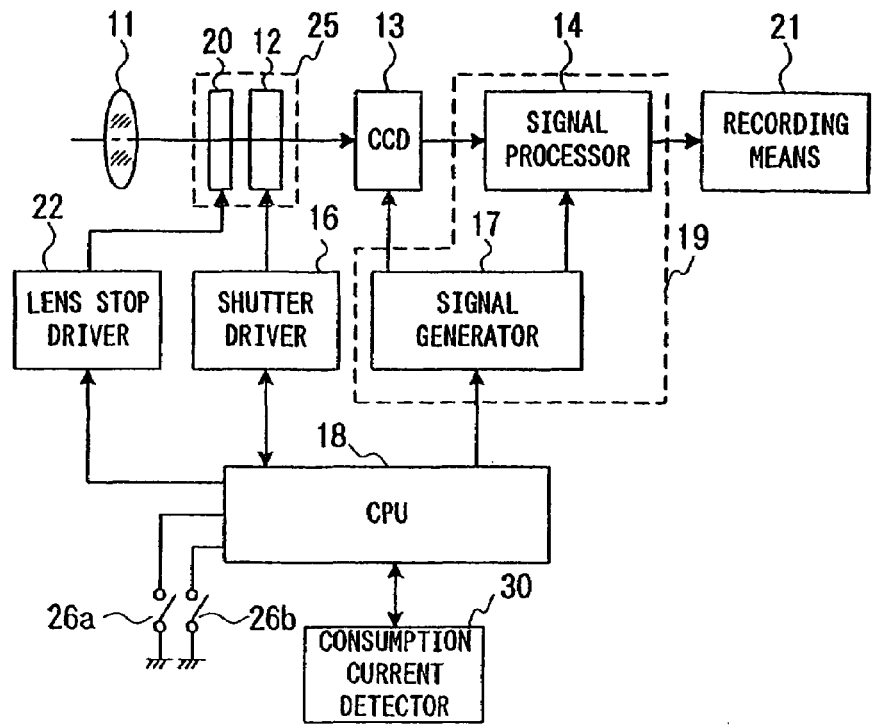
FIG. 14 shows a block diagram showing a modified construction according to the present invention.

FIG. 14 shows a further modification. In this instance, a consumed current detector 30 for detecting the consumed current in the entire system is provided in connection to the CPU 18. According to the output of the consumed current detector 30, the CPU 18 may detect the maximum total consumed current during the inoperative state of the lens stop means 20, store the detected current value in an internal RAM or a $E^2ROM$ (not shown) and control the sweep-out frequency f during the operation of the lens stop means 20 such that the total consumed current during the operation of the lens stop means 20 is less than the stored maximum current value. In this way, it is possible to effectively prevent the system stoppage or burn-out of a fuse provided in a power supply system. Also, the consumed current detector 30 may be suitably combined with the battery checker 27, the strobo means 28 and/or the temperature sensor 29 noted above for controlling the sweep-out frequency in the k-line read-out mode in the second to fifth embodiments such that the total consumed current is less than the stored maximum total consumed current in the inoperative state of the lens stop means 20.

In the second to fifth embodiments, in the period from the instant of generation of the first trigger pulse till the instant of generation of the recording trigger signal the signal current in the continuous k lines of the central part of the light incidence surface of the CCD 13 is read out in the k-line read-out mode, the continuous k lines may constitute any desired area of the light incidence surface. Furthermore, since it is sufficient if their release time lag can be reduced by improving the frame rate, it is possible to set any desired read-out mode, such as one in which in the period from the first trigger pulse to the recording trigger signal thin-out read-out of all lines or lines in a certain area may be done or signal charge of lines read out by the thin-out read-out is read out while being suitably added together.

The imaging element may not be of the inter-line CCD type having the vertical over-flow drain structure as described before, and the present invention is effectively applicable in the cases of using CCD imaging elements having different functions as well.

As has been described in the foregoing, according to the present invention the sweep-out frequency at which to sweep-out unnecessary charge in the imaging element with a sweep-out means is controlled, so that it can be set to a lower frequency. Thus, it is possible to reduce the peak consumed current in the entire system and effectively permit power consumption reduction and battery life extension.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An imaging apparatus having an imaging element for accumulating signal charge corresponding to an incident scene light flux in a photo-electric converting element section comprising:
   a strobo means for illuminating the scene incident on the imaging element;
   a sweep-out means for sweeping out unnecessary charge in the imaging element; and
   a control means for setting a lower sweep-out frequency of the sweep-out means when the strobo means is being charged than when the strobo means is not being charged.

2. The imaging apparatus of claim 1, wherein said imaging element is powered by a power source, said control means including means conducting a voltage check operation for monitoring a power source voltage level to prevent charging of said strobo means when said voltage level is below a predetermined threshold voltage.

3. The imaging apparatus of claim 1, further comprising a shutter release button movable to a partially depressed position;
   said control means initiating a voltage check operation when said shutter release button is moved to said partially depressed position.

4. The imaging apparatus of claim 1, further comprising a shutter release button movable to a partially depressed position and a fully depressed position;
   said control means initiating a voltage check operation when said shutter release button is moved to said partially depressed position.

5. The imaging apparatus of claim 4, wherein said control means monitors said strobo means to determine if said strobo means is charging responsive to completion of a voltage check operation and movement of said shutter release button to said fully depressed position.

6. The imaging apparatus of claim 5, wherein said control means further includes means for returning to said voltage check operator when a previous voltage check operation is completed and the shutter release button has failed to move so said fully depressed position.

7. A method for operating an imaging apparatus having an imaging element for accumulating signal charge corresponding to incident scene life flux in a photo electric converting element section, said imaging apparatus being powered by a power source and including a strobo means, comprising:
   a) monitoring the power source;
   b) setting a frequency of a sweep out signal for sweeping out unnecessary charge from the imaging element whereby a higher frequency sweep out signal is set when an output voltage level of the power source is greater than a first predetermined voltage and setting a lower frequency for the sweep out signal when the output voltage level is lower than said first predetermined voltage; and
   c) monitoring said strobo means and setting the frequency of the sweep out signal at said lower frequency when said strobo means is being charged to thereby reduce energy output form the power source when the sweep out operation is being performed during the time that the strobo means is being charged.

* * * * *